US006970889B2

United States Patent
Flanagin et al.

(10) Patent No.: US 6,970,889 B2
(45) Date of Patent: Nov. 29, 2005

(54) SYNCHRONIZING A STORE WITH WRITE GENERATIONS

(75) Inventors: Stephen D. Flanagin, Sammamish, WA (US); Michael Ginsberg, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 2 days.

(21) Appl. No.: 10/864,029

(22) Filed: Jun. 9, 2004

(65) Prior Publication Data

US 2004/0225694 A1    Nov. 11, 2004

Related U.S. Application Data

(63) Continuation of application No. 09/879,384, filed on Jun. 12, 2001, now Pat. No. 6,856,999.

(60) Provisional application No. 60/237,331, filed on Oct. 2, 2000.

(51) Int. Cl.[7] ............................................. G06F 17/30
(52) U.S. Cl. ..................................... 707/201; 707/200
(58) Field of Search ............................. 707/200–201, 707/10

(56) References Cited

U.S. PATENT DOCUMENTS 6,343,299 B1 *   1/2002   Huang et al. ................ 707/203
6,636,873 B1 * 10/2003   Carini et al. ................. 707/201
6,694,336 B1 *   2/2004   Multer et al. ................ 707/201

* cited by examiner

*Primary Examiner*—Greta Robinson
*Assistant Examiner*—Sathyanarayan Pannala
(74) *Attorney, Agent, or Firm*—Workman Nydegger

(57) ABSTRACT

Systems and methods for synchronizing a device and for ensuring that updates to the device occurring during synchronization are not re-synchronized to the synchronization partner. Generation identifiers (GIDs), which are updated each time a synchronization occurs, are assigned to objects in a store. When synchronization occurs, a sync client uses state information, which is used to indicate which generations have been synchronized, to determine which objects have changed since the last synchronization. The state information includes reserved write GIDs that are only used by a particular sync client that performs writes during a synchronization. Objects having a GID that matches a write GID are not synchronized because they were written by the sync client during the previous synchronization.

13 Claims, 5 Drawing Sheets

| | SC1 WGID | SC1 PRIOR WGID | SC2 WGID | GLOBAL GID | PUBLIC GID |
|---|---|---|---|---|---|
| SYNCHRONIZATION CHECKPOINT FOR SC1 | CLEAR | | | 12 | |
| INCREMENT GID; ASSIGN GID TO PUBLIC GID | | | | 13 | 13 |
| PURGE WGID OF SC1 | CLEAR | CLEAR | | | |
| SAVE SC1 SYNC STATE OBJECT | | | | | |
| DETECT WHICH OBJECTS HAVE CHANGED | | | | | |
| OBJECT HAS CHANGED IF | | | | | |
| GID > SYNC FROM GID | | | | | |
| GID ≤ SYNC TO GID | | | | | |
| AND NOT IN WGID LIST | | | | | |
| SC1 DOES A WRITE UPDATE | | | | | |
| IS SC1 A SYNC CLIENT: CURRENT WRITE GID VALID ? | | | | | |
| INCREMENT GID | | | | 14 | |
| SC1 WGID = GID | 14 | | | | |
| SAVE SC1 SYNC STATE OBJECT | | | | | |
| SYNCHRONIZATION CHECKPOINT FOR SC2 | | | | | |
| INCREMENT GID: STORE GID IN PUBLIC WRITE GID | | | | 15 | 15 |
| PURGE WGID OF SC2 | | | CLEAR | | |
| SC1 DOES A WRITE UPDATE | | CLEAR | | | |
| IS SC1 A SYNC CLIENT; CURRENT WRITE GID VALID ? | | | | | |
| INCREMENT GID | | | | 16 | |
| MOVE CURRENT WRITE GID TO WRITE GENERATION LIST | | 14 | | | |
| SC1 WGID = GID | 16 | | | | |
| SYNCHRONIZATION CHECKPOINT FOR SC1; INCREMENT GID | | | | 17 | 17 |
| PURGE WGID OF SC1 (WGID<13) | 16 | 14 | | 17 | |

FIG. 5

SYNCHRONIZING A STORE WITH WRITE GENERATIONS

CROSS-REFERENCE TO RELATED APPLICATIONS

This application is a continuation of and claims the benefit of earlier filed application U.S. Ser. No. 09/879,384, filed on Jun. 12, 2001 now U.S. Pat. No. 6,856,999, and U.S. Provisional Application No. 60/237,331, entitled "WRITE GENERATIONS", filed on Oct. 2, 2000, which are hereby incorporated by reference.

BACKGROUND OF THE INVENTION

1. The Field of the Invention

The present invention relates to systems and methods for synchronizing a device. More particularly, the present invention relates to systems and methods for synchronizing objects stored on a device such that corresponding objects that are retrieved from a synchronization partner during synchronization and updated on the device are not synchronized back to the synchronization partner in future synchronizations.

2. Background and Relevant Art

Wireless and portable devices, such as cellular telephones, personal digital assistants (PDAs), pagers, and hand held computers, are being used by consumers at an increasing rate. Consumers use these devices to store and access information such as email, contact data, calendar data, and other documents. Much of this information is from synchronization partners such as home computers, office computers or the Internet and is received over various communication channels such as docking stations and wireless channels. The utility provided by wireless devices has made them an integral part of the daily activities of many consumers.

Typically, the ability of these devices to store information is significantly less than the ability of the device's synchronization partners and much of the information that is stored on a wireless or portable device is actually a copy of information that already exists on the stores of the synchronization partners. Because the storage capacity of the synchronization partners is usually larger than the storage capacity of the device, the device can only store a portion of the information that can be stored on the partners.

As a result, portable and wireless devices are often synchronized with various synchronization partners. Synchronizing a device with one or more synchronization partners is a significant issue because the information stored by wireless devices must be updated in order for the information to retain its value. Various methods have been employed to synchronize a wireless device. The crudest method is for the wireless device and the synchronization partner to determine what data they have, compare their data and perform those actions that are necessary to make both the synchronization partner and the wireless device have the same data. This type of synchronization is not efficient because of the high processing cost involved. In addition, the air time usage may be substantial, which may increase the monetary cost of using the wireless device.

Another method that has been employed to synchronize data is to create a property value for each and every object in the store. This property value will be incremented each time that an object changes in the store. The problem with this approach is that the memory required to store the property value of each object will have to be relatively large in order to accommodate all of the potential changes that the store may experience without exceeding the storage capacity of the change or property value. Another issue with this approach is that because the relatively large property value is stored with each object, the amount of memory consumed by these property values in the aggregate can be significant.

Even though many synchronization methods exist, data is often synchronized unnecessarily. This problem is evident when an update to an object in the store of the device occurs during synchronization and is particularly troublesome when the update or write to the object in the store of the device originates with the synchronization partner that is currently synchronizing with the device. Typically, the origin of this update is not remembered and during the next synchronization, the update will by synchronized back to the synchronization partner. This can needlessly consume air time, bandwidth, processing power, or device memory and can even generate needless conflicts or loss of data.

BRIEF SUMMARY OF THE INVENTION

When a device such as a wireless or portable device synchronizes with a synchronization partner, it is necessary to determine which objects stored on both the device and the synchronization partner have changed since that last synchronization. In accordance with the present invention, each object in the store of the device includes a generation property that stores a generation identifier (GID). When an object is changed, the property storing the GID receives a current or present value of a global GID. The GID of the object does not increase with every change to the object or to the store. Rather, the GID of the object is assigned the present value of a write GID that is associated with the client that is performing the write to the object. The global GID is usually changed when a new synchronization is started, but can be changed in other circumstances as well.

When a sync client begins to synchronize the device with the synchronization partner, it examines state information that identifies which generations have already been synchronized. Based on the state information and the present value of the GID, the sync client is able to identify which objects have changed since the last synchronization and should therefore be synchronized. Thus, only those objects that have changed, or have a value for their GID property that is within a range specified by the state information, will be synchronized.

When the sync client performs an update or writes to the store of the device, the sync client is assigned or reserved a particular reserved GID that only that particular sync client can use. This ensures that objects having the reserved GID could only have been changed or written by that sync client. Other sync clients and applications are precluded from using the reserved GID, which is stored in the state information of the sync client performing the update. By storing the reserved GID in the state information, those objects that were updated by the sync client can be identified during the next synchronization. For example, the value of the GIDs of the objects in the store of the device are compared with the reserved GIDs that may be stored in the state information of the sync client. Those objects whose GID matches a reserved GID of the synchronizing sync client are not synchronized.

One advantage provided by reserved or write GIDs is that during the next synchronization, objects written to the device's store during synchronization with the synchronization partner will not be synchronized back to the synchronization partner in future synchronizations. In other words, those objects that have a GID that matches a reserved GID of a sync client will be excluded from a manifest list created by the sync client that lists which objects are to be updated or synchronized to the synchronization partner.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5 is a table illustrating the use of GIDs when more than one sync client synchronizes the store of a device.

DETAILED DESCRIPTION OF THE PREFERRED EMBODIMENTS

Figure 1:
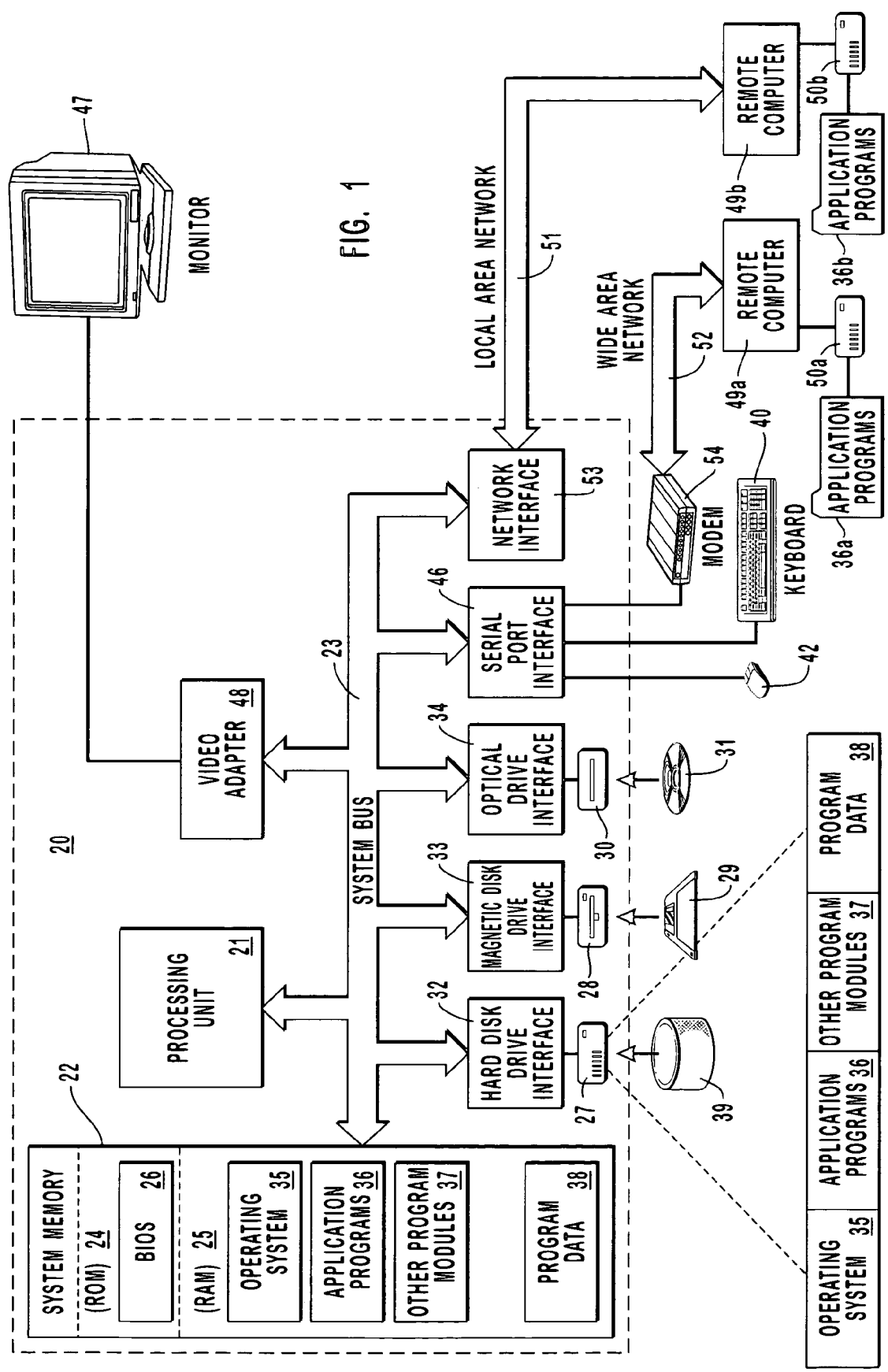
FIG. 1 illustrates an exemplary system that provides a suitable operating environment for the present invention.

The present invention relates to systems and methods for synchronizing a device with one or more synchronization partners and more specifically to using reserved write generation identifiers (GIDs) to prevent objects from being synchronized unnecessarily. The main goal of synchronization is to identify changes to data objects on both the device and the synchronization partner and to update both the device and the synchronization partner such that they both have the same content. The present invention utilizes reserved or write GIDs, which are used during the synchronization process to determine which data objects have changed since the last synchronization. Each separate sync client is assigned one or more reserved GIDs that only that sync client can use. This enables the origin of object updates to be more easily identified such that they are not synced back to their origin.

After the changed objects have been identified, they are updated such that the synchronization partners and the device are current with respect to each other. As used herein, changing or updating an object includes, but is not limited to, creating the object, modifying the object, updating the object, moving the object, deleting the object, and the like.

Using GIDs is advantageous because they are incremented less frequently than change identifiers, which are incremented each time an object is changed. As a result, less memory is required to store the GIDs. This is particularly useful in wireless and portable devices, which typically have limited memory or storage capacity. Using GIDs also reduces the overhead that typically occurs during synchronization. By reducing the overhead as well as the amount of memory required to store the GIDs, the overall cost of synchronization is reduced, especially in wireless devices, which typically have small bandwidths and can incur additional cost while synchronizing.

The present invention also employs reserved GIDs that are primarily utilized when a synchronization partner changes an object by causing an update or a write operation to be performed to an object on the store of the device. Without the reserved GIDs, the objects that the sync client writes during the current synchronization would appear as changed objects during the next synchronization with the synchronization partner. As a result, they would be unnecessarily synchronized back to the synchronization partner. Reserved GIDs eliminate this problem by allowing those objects updated or written by the sync client to be identified such that the objects are not synchronized unnecessarily.

The present invention extends to both methods and systems for synchronizing data objects stored on a device with one or more synchronization partners. The present invention also extends to both methods and systems for preventing objects from being unnecessarily synchronized. The embodiments of the present invention may comprise a special purpose or general purpose computer including various computer hardware, as discussed in greater detail below.

Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, cellular devices, pagers, personal digital assistants (PDAs), Internet appliances, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

Figure 2:
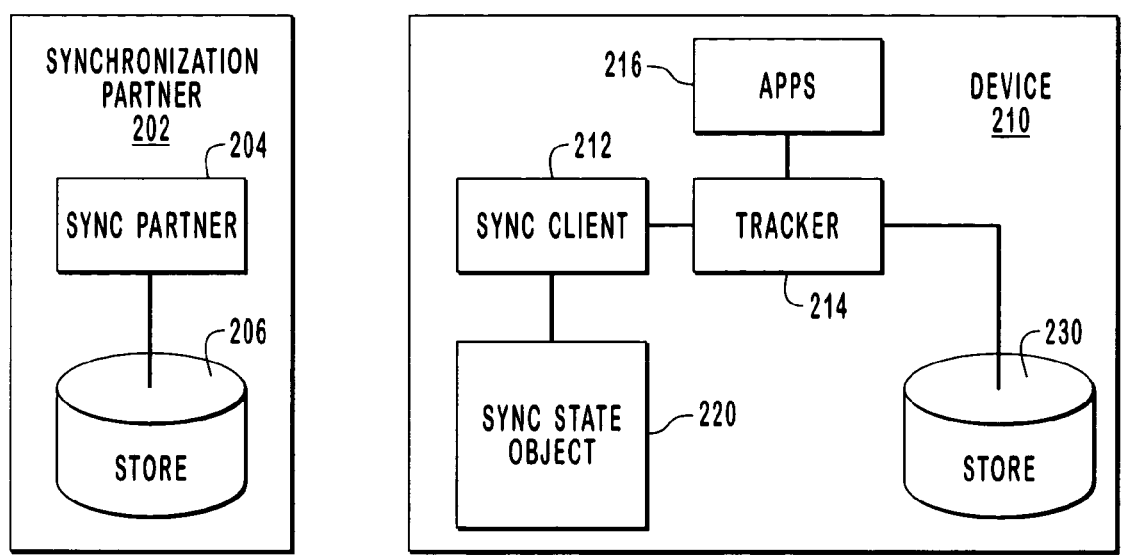
FIG. 2 is a block diagram illustrating a device that synchronizes with a synchronization partner through a sync client.

FIG. 2 is a block diagram illustrating a device that is synchronizing with a synchronization partner. A synchronization partner 202, which may be a desktop computer, network computer, a server computer, and the like, has access to a store 206. When the synchronization partner 202 synchronizes with the device 210, a sync partner 204 is used to assist in the synchronization of the store 206 with the store 230 of the device 210.

The device 210 has a sync client 212 that works with the sync partner 204 during synchronization. As will be described in more detail with reference to FIG. 3, the sync state object 220 contains a synchronization state or state information that is used to determine which objects on the store 230 have changed and need to be synchronized. The tracker 214 keeps track of the GID and alters information in the sync state object 220 accordingly. The applications (apps) 216 may make changes to the store 230 using a public value of the GID, which is often stored globally. In addition, it is possible that other sync clients, which function in a manner similar to the sync client 212, may operate simultaneously with the sync client 212.

Figure 3:
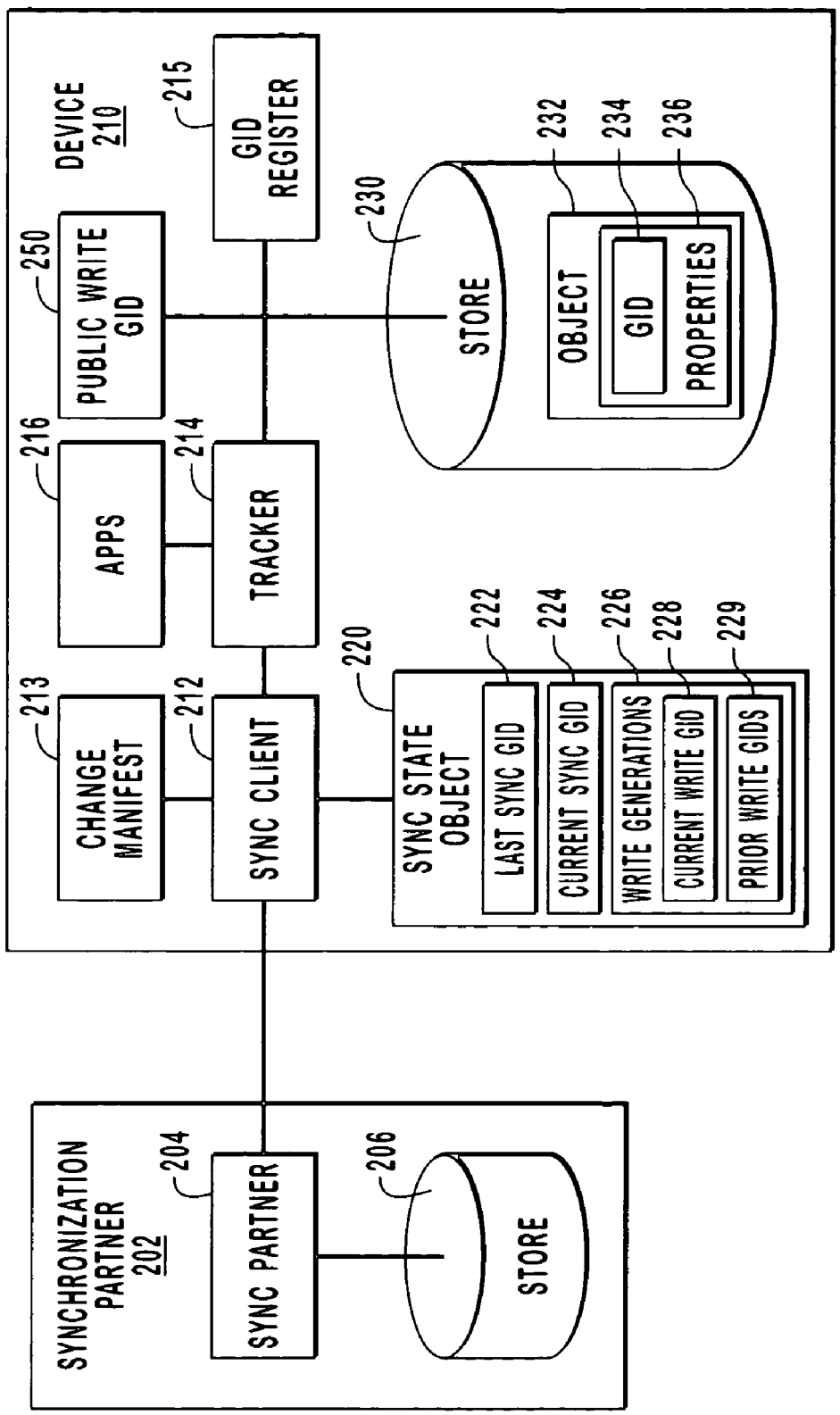
FIG. 3 is a more detailed block diagram of FIG. 2 and further illustrates both the sync state object that identifies which generations are to by synchronizes and the GID property of locally stored objects.

FIG. 3 is a more detailed block diagram that more fully explains the use of GIDs. In particular, FIG. 3 more fully explains the use of reserved or write GIDs. The device 210 maintains a GID register 215 that keeps a present or current value of the global GID. The device 210 also maintains a public write GID 250, which is used by public applications or by applications that are not synchronizing with the device. Whenever an object is changed, a write GID is assigned to the object. If the client performing the change is not a sync client, then the write GID is the public write GID 250. If the client performing the change is a sync client, then the write GID assigned to the object is the current write GID 228 of the sync client. Before the sync state object is updated, which occurs when a sync checkpoint is initiated, the Sync From GID 222 and the Sync To GID 224 represent the generations of changes to objects in the store 230 that were synchronized during the last synchronization.

After the sync state object 220 is updated, as will be described in more detail below, the objects that need to be synchronized between the device 210 and the synchronization partner 202 will therefore have a GID property 234 whose value is between the Sync From GID 222 and the Sync To GID 224. In some circumstances, objects whose GID property 234 is equal to the value of the Sync From GID 222 and/or the Sync To GID 224 are also synchronized. The sync state object also keeps track of the write generations 226, which includes a current write GID 228 and a write generation list 229, which usually represent generations that were written by the sync client 212 during a synchronization between the device 210 and the synchronization partner 202.

In the store 230, each object 232 has properties 236, which includes a GID property 234 that stores a GID value of either the current write GID 228 or the public write GID 250. This decision is dependent on the application that changed the object. As previously stated, a public application will cause the public write GID 250 to be stored in the GID property 234 while a sync client will use the current write GID 228 that is associated with the sync client.

The GID property 234 is effectively altered each time that an object is changed. However, the value of the GID property 234 is not always changed. Rather, when the object 232 is changed, the GID property 234 is changed to match the value of either the public write GID 250 or the current write GID 228, depending on the client that changed the object. It is therefore possible for the object 232 to change without changing or altering the content of the GID property 234. The value received by the GID property 234 when the sync client performs an update to the object 232 will be discussed in more detail below.

After a sync checkpoint has been performed, the sync state object 220 is used to identify generations that are to be synchronized. More specifically, the sync state object 220 is used to determine which objects have changed since a synchronization was last performed with respect to the synchronization partner 202 and the device 210. When a synchronization begins, it is necessary to update the sync state object. The Sync From GID 222 receives the current value of the Sync To GID 224 and the Sync To GID 224 receives the present value of the GID register 215. Next, the tracker 214 increments the GID register 215 and assigns that value to the public write GID 250. All changes subsequently made to objects in the store 230 by the apps 216 will have their GID property 234 receive the public write GID 250.

The final step of updating the sync state object 220 is to purge the write generations 226. The write generation list 229 and the current write GID 228 store one or more values of the global GID, which correspond to reserved or write GIDs. The reserved GIDs in the write generation list 229 and/or the current write GID 228 that are less than or equal to the updated Sync From GID 222 are purged or removed.

Next, the sync client 212 creates a change manifest 213, which is a list of objects that have changed since the last synchronization with the synchronization partner 202 and are to be synchronized in the current synchronization between the device 210 and the synchronization partner 202. The objects represented in the change manifest 213 are identified by determining which objects have a GID property 234 that is greater than the Sync From GID 222 and less than or equal to the Sync To GID 224. Those objects whose GID property 234 matches a reserved GID in the write generation list 229 or the current write GID 228 are excluded from the change manifest 213. Once the changed objects are identified, the sync client 212 synchronizes the objects represented in the change manifest 213 with the synchronization partner.

Of course, the sync client 212 must also retrieve changed objects from the store 206 of the synchronization partner 202 during synchronization. Because these changes are written to objects in the store 230, the objects that are written or changed will receive the value of the current write GID 228. In some circumstances described below, the sync client 212 will need to get a new current write GID 228 before writing to the objects in the store 230. In the absence of one aspect of the present invention, the changes made when the sync client 212 writes to the store 230 would be synchronized to the synchronization partner 202 unnecessarily during the next synchronization between the device 210 and the synchronization partner 202.

This situation is avoided by the tracker 214 in this example, which detects that the sync client 212 is performing the write to the store 230. The tracker 214 can examine a process identifier of the process making a change to an object in the store 230 and compare it with the process identifier of the process that performed a synchronization checkpoint. If the process identifiers match, then the tracker 214 knows that the sync client 212 is making a change to one or more objects in the store 230. Whenever an object 232 is created or changed, the write GID of the client that is creating or changing the object is placed into the GID property 234 of the object 232. If the client is an a public application such as apps 216, then the public write GID 250 is placed in the GID property 234. If the client is a sync client, the current write GID 228 of the sync client is placed in the GID property 234.

When the object 232 is changed or written, the tracker 214 determines if the sync client has a current write GID 228 that is valid. If a current write GID 228 is not present or is less than or equal to the public write GID 250, a new write GID is assigned as follows. The GID register 215 is incremented. If the sync client has a GID in the current write GID 228, it is moved to the write generation list 229. The value in the GID register 215 is then placed in the current write GID 228 of the sync client. Next, the new value that is in the current write GID 228 is placed in the GID property 234 of the object 232 that is being changed or written. The value of the current write GID 228 is unique to the associated sync client and is not used by any other client. In other words, any updates or writes performed by the sync client 212 have a GID that is unique to the sync client 212. Other applications that write or update objects will use the public write GID 250.

The following example illustrates how GIDs are used in the context of the present invention. The sync client 212 starts by issuing a sync checkpoint request to the tracker 214. The tracker 214 then locks out all access to the store 230 until the following actions can be performed. First, assume that the global GID or the GID register 215 contains a value of 11 when a sync checkpoint is initiated by the synchronization partner 202. If, for example, the previous value of the Sync To GID 224 was 8, then the Sync From GID 222 receives the previous value of the Sync To GID 224, which is 8. The Sync To GID receives the current value of the global GID, which is 11. The GID register 215 is then incremented to a value of 12 and this value is stored in the public write GID 250. If apps 216 makes changes to objects in the store 230 at this point, those objects will receive the present value of the public write GID 250, which is currently 12. Any value currently in the write generations 226 are cleared if their value is less than or equal to the value in the Sync From GID 222. Access to the data store 230 is restored at this time by the tracker 214 and the sync state object 220 is then stored in persistent memory.

Next, the sync client 212 creates a change manifest 213, which contains a list of objects in the store 230 that have changed since the last synchronization. In this case, the objects are examined and those that have a GID property 234 that is greater than the Sync From GID 222, which is 8, and that is less than or equal to the Sync To 222, which is 11, are identified as objects that have changed and should be updated or synchronized. Objects whose GID property 234 is equal to a reserved GID stored in the write generations 226 are excluded from the change manifest 213.

Because objects are being updated in both the store 230 of the device 210 as well as the store 206 of the synchronization partner 202, objects on the store 230 are often changed by the sync client 212. If an object is written, updated or changed by the sync client 212, the tracker 214 ensures that those objects have a GID that is unique to the sync client 212. In this example, a check is done by the tracker 214 when a sync client attempts to write an object. If the current write GID 228 is empty or has a value that is not greater than the current public write GID 250, the tracker 214 assigns a new value to the current write GID 228 of the sync client. First, the tracker 214 disables all access to the store 230. The value of the current write GID 228 is moved to the write generation list 229. Next, the GID register 215 or the global GID is incremented to a reserved GID of 13 and the reserved value of 13 is assigned to the current write GID 228 and to the GID property of the object being updated or written. The global GID or the GID register 215 will be incremented at a later time before a GID is assigned to any client to insure that only the sync client 212 uses a reserved GID of 13. In other words, the GID of 13 is a reserved or write GID for writes or changes performed by the sync client 212. Finally, the tracker 214 restores access to the store 230 and the sync client will persist the updated sync state object 220.

During any particular synchronization, the write generation list 229 can contain one or more reserved GID values. Whenever a new synchronization checkpoint is performed, those GIDs in the write generations 226 that are stale are purged. In one example, a write GID is stale if it is less than or equal to the Sync From GID 222. This is performed because the current synchronization is usually limited to those generations that are between the Sync From GID 222 and the Sync To GID 224 as previously described.

Typically, the write generations 226 contains GIDs for writes that occurred during the most recent synchronization with a particular synchronization partner. Reserved GIDs from older synchronizations are purged from the write generations 226 such that the current synchronization checkpoint begins with only the reserved GIDs that are necessary to prevent writes made by the sync client 212 to the store 230 from being re-synchronized to the synchronization partner 202.

During the synchronization between the synchronization partner 202 and the device 210, it is possible for another sync client or for other applications to update objects in the store 230. These updates will be synchronized by the device 210 and the synchronization partner 202 during a next synchronization because the GID property of the updated objects will likely be within the range of GIDs specified by the sync state object 220 after it is updated for the next synchronization.

Figure 4:
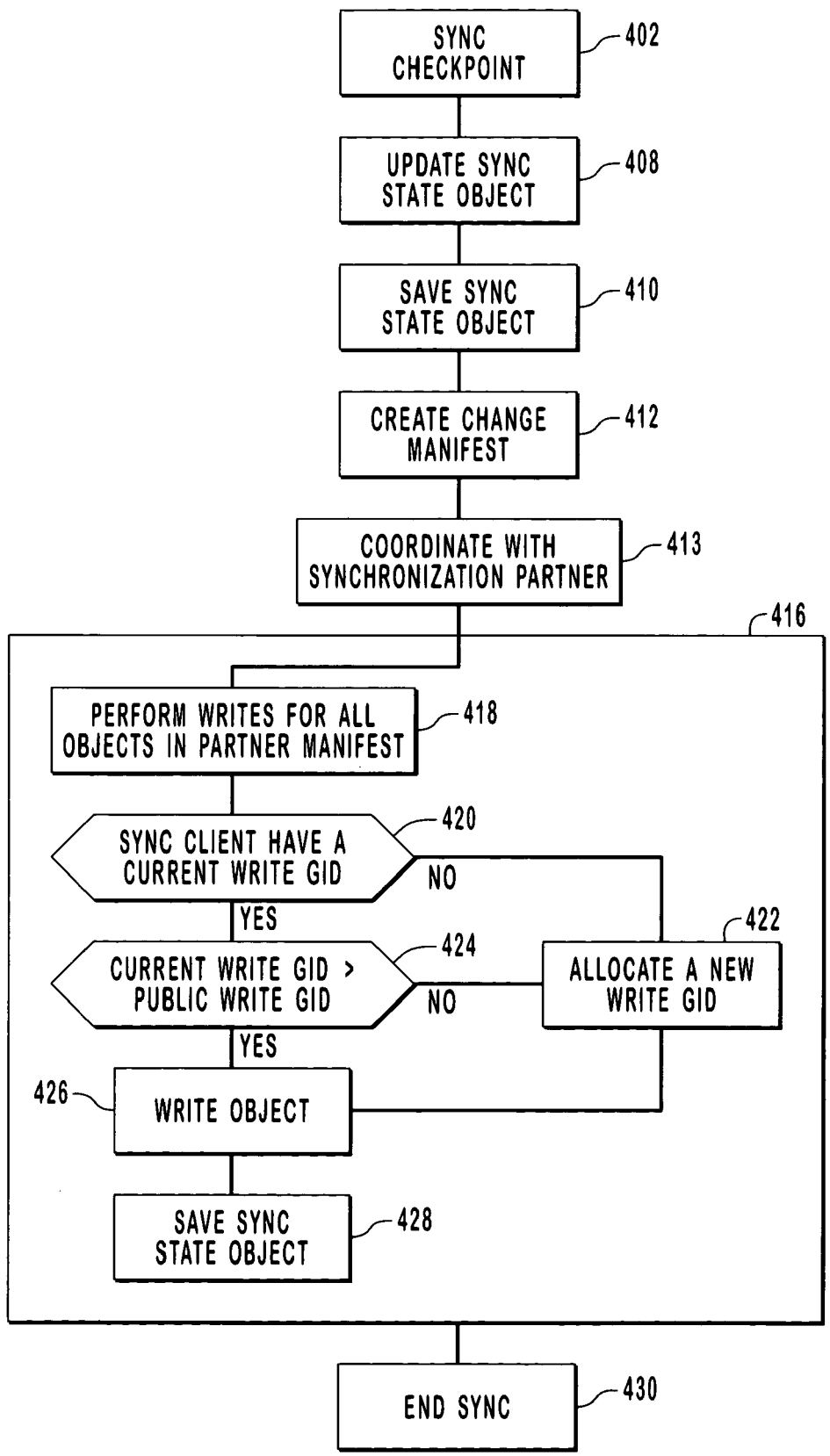
FIG. 4 is a flow diagram depicting an exemplary method for synchronizing a local store using reserved write GIDs.

FIG. 4 is a flow diagram that illustrates an exemplary method for synchronizing a synchronization partner with a device such that updates made to the store of the device during synchronization are not synchronized back to the synchronization partner during future synchronizations. First, a synchronization checkpoint is performed (402) by a sync client. The synchronization checkpoint can include an act of passing in state information via a sync state object that reflects that status of the last synchronization.

The information in the sync state object is updated (408) for the current synchronization. For example, the Sync From GID and the Sync To GID are updated and certain write GIDs may be purged from the sync state object as previously described. More specifically, the Sync From GID is set equal to the Sync To GID, the Sync To GID is assigned the current value of the public write GID 250, the current write GID (if present) is moved to the write generation list, the write generation list is purged of stale GIDs, the GID register 215 is incremented, and the public write GID 250 is assigned the current value in GID register 215.

At (410) the sync state object is saved. It is necessary to persist the sync state object whenever the sync state object is updated. This usually occurs when a synchronization checkpoint occurs. This also occurs when a write is performed by the sync client because a reserved or write GID is added to the write generations of the sync state object.

At (412) a change manifest is created and the objects that have changed since the last synchronization are detected. Detecting which objects have changed includes an act of comparing GIDs. To be included in the change manifest, the value of an object's GID, which is stored in the object's GID property, should be greater than the Sync From GID and less than or equal to the Sync To GID and not equal to any of the reserved GIDs stored in the write generations of the sync state object. The Sync From GID and the Sync To GID essentially define all generations or GID values that have occurred since the last synchronization. At (413), the change manifest is sent to the synchronization partner and the partner change manifest is received.

When a synchronization partner synchronizes with a device, it is often necessary to update the local store of the device (416). This is accomplished by performing (418) writes for all objects in the partner manifest list. When an update occurs and the sync client does not have a valid current write GID (420), the sync client is assigned (422) a special write or reserved GID by incrementing the value of the GID register 215 , assigning that value to the write generations 226 kept in the state information of the sync client. If the sync client has a current write GID, its validity is determined by ensuring that the current write GID is greater than the public write GID (424). If the current write GID is not valid, it is assigned a new current write GID (422) and the sync state object is persisted (428) The objects updated or written (426) by the sync client receive the reserved GID in their GID property. By assigning a reserved GID that only the sync client can use, those objects that have a GID that is equal to a reserved GID will not be synchronized back to the synchronization partner. At (430), the synchronization ends.

FIG. 5 is a diagram that illustrates how the value of the GID changes when a synchronization occurs with more than one sync client. The table 500 represents actions that occur during synchronization with a first sync client (SC1) and a second sync client (SC2) and is explained with reference to FIG. 3. It is understood that SC1 and SC2 may be the same software and that different state information is accessed as required. Alternatively, a separate instance of the sync client software can be used for SC1 and SC2. This description of the table 500 will assume that the global GID has a present value of 12, although the GID can have any other value. The table 500 focuses on the actions that occur when a sync client performs a synchronization checkpoint.

The column 501 represents the Sync To GID 228 (shown in FIG. 3) of a sync state object for SC1. The column 502 represents the write generation list 229 (also shown in FIG. 3) of the sync state object of SC1. The column 503 illustrates the Sync To GID of a sync state object of SC2. The column 504 represents a present value of the global GID, which is stored in the GID register 215 (shown in FIG. 3). The column 505 represents the present value of the public write GID 250 (also shown in FIG. 3). In the description of FIG. 5, some acts or steps, which have been previously described with reference to other Figures, are omitted.

In row 506, SC1 performs a synchronization checkpoint and the current GID is 12 as shown in column 504. In row 507, the global GID to be incremented to 13 and the global GID is also assigned to the public write GID as shown in column 505. In row 508, the current write GID is assumed to be empty in this example. The write generation list associated with SC1 is also assumed to be empty and is clear as shown in column 502. If the current write GID and the write generation list of SC1 did contain values, they are purged to the extent that their value is less than or equal to the value of the GID currently stored in the Sync From GID 222 of the sync state object of SC1, which has been updated. More generally, the only values of the write generations 226 that are retained by SC1 are those that have the potential of being unnecessarily synced back to the synchronization partner. In one example, these reserved GID values are limited to those that were stored in the write generations 226 during the last synchronization performed by the SC1.

In row 509, the sync state object of SC1 is persisted or saved. In rows 510 through 514, those objects that have changed are detected and the change manifest 213 is created. Assume that the Sync To GID had a value of 6 before the sync state object was updated. After the sync state object was updated, the Sync From GID has a value of 6 and the Sync To GID has a value of 12. The current value of the global GID is currently 13. Thus, the changed objects for the current synchronization are those that have a GID property 234 that is greater than 6 and less than or equal to 12. Because the write generations 226 of the SC1 is currently clear, no objects will be excluded from the synchronization because their GID matches a GID stored in the write generations of SC1.

In row 515, the SC1 performs an update or writes to the store of the device. A determination is made that SC1 is a sync client as previously described in row 516 by comparing the process identifier of the process making the update with the process identifier of the process that performed the sync checkpoint. Also in row 516, a determination is made whether the sync client's current write generation GID exists and is greater than the public write GID. If true, the process skips to row 521. Otherwise a new current write GID is assigned to SC1 starting in row 517. In row 517, the global GID is incremented to a reserved value of 14 and in row 518, the reserved value of 14 is assigned to the current write GID 228 of the sync state object of SC1. Other applications that write or otherwise update objects will use the public value of the global GID, which is still 13 as shown in column 505. While this process is occurring, it is important to ensure that another client or application does not perform a write while the various GIDs are being assigned. In one example, this may be accomplished by locking other applications out during this critical period. In row 520, the sync state object is saved.

In row 521, SC2 begins a synchronization checkpoint. In row 522 the GID is incremented to 15 and the new global GID value of 15 is stored in the public write GID as shown in column 505. In row 523, the write generations 226 of SC2 are purged as previously described.

At this point, the SC1 performs another write operation in row 524. SC1 is determined to be a sync client in row 525 and a check is performed to determine if SC1 has a valid current write GID 228 as described above. If SC1 has a valid current write GID, the process skips to row 530. Otherwise the process proceeds in row 526, where the global GID is incremented to a reserved value of 16. The present value of the current write GID, which is 14 is transferred or moved to the write generation list as indicated in row 527, while the reserved value of the global GID (which is 16) is stored in the current write GID of SC1 in row 528. Thus, SC1 has a current write GID of 16 and a reserved value of 14 in the write generation list of SC1. Finally, the sync state object of SC1 is persisted. Again, care is taken to ensure that only SC1 can cause objects to have a GID property of 16.

If SC2 were to perform a write at this point, it would be assigned a current write GID that is different from both the write generations of SC1 and the public write GID and those steps and acts that have been described with respect to SC1 would occur with respect to SC2. At a later point in time, SC1 again performs a synchronization checkpoint at row 530 and the GID is increased to 17 and assigned to the public write GID. In row 531, the write generations 226 of the sync state object of SC1 is purged. In this case however, the current write GID of 16 and the prior write GID of 14 are both greater that the value of 12, which is now the value held by the Sync From GID 222 of the updated sync state object. These values are not purged because it is likely that some objects will have a GID property of 14 or 16. However, the values of 14 and 16 will likely be purged from the write generations the next time that SC1 performs a synchronization checkpoint because they will be less than 17, which will be the value occupying the Sync From GID 222 of the sync state object for the next synchronization. In this manner, the use of write or reserved GIDs, which are stored in the write generations 226, can be used to prevent an object from being synchronized back to a synchronization partner.

Updating the sync state block has been described such that the change manifest list is determined by checking for generation properties that are greater than the Sync From GID and less than or equal to the Sync To GID. The present invention also covers situations where the sync state block is updated and the global GID is incremented in a fashion such that the change manifest may be determined by checking for generation properties that are greater than or equal to the Sync From GID and less than the Sync To GID. In this case, the write generations will be updated accordingly. It is also permissible to alter the order in which the acts and steps of the present invention are performed in certain instances. For example, it may be necessary to increment the global GID before the sync state object is updated.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a system including a device that synchronizes with a synchronization partner, wherein objects or changes to objects are written to the device during synchronization, a method for synchronizing the device and the synchronization partner such that the objects or changes to objects written to the device during synchronization are not synced back to the synchronization partner in future synchronizations, the method comprising acts of:
   performing a synchronization checkpoint by a sync client of the device to initiate a synchronization between the synchronization partner and the device;
   updating a synchronization state in a sync state object using the value of the global GID, wherein the synchronization state includes a Sync To GID, a Sync From generated identifier, and write generations, wherein the write generations include a current write generated identifier and a write generation list as, further comprises the act of:
   assigning a current value of the Sync To GID to the Sync From GID;
   assigning the present value of the global GID to the Sync To GID;
   transferring a value of the current write GID to the write generation list; and
   removing values from the write generation list that are less than or equal to the Sync From GID;
   incrementing a global GID to a new value from the present value;
   detecting changed objects based on the synchronization state; and
   synchronizing the changed objects, wherein the write generations prevent objects or changes to objects written by the sync client from being synchronized unnecessarily.

2. A method as defined in claim 1, wherein the act of detecting changed objects based on the synchronization state further comprises acts of:
   examining a generation property for each object in the store of the device; and
      for those objects that have a generation property whose value is greater than the Sync From GID and less than or equal to the Sync To GID and that is not equal to any GID in the write generation list, representing those objects in a change manifest for synchronization.

3. A method as defined in claim 2, further comprising an act of synchronizing the changed objects represented in the change manifest.

4. A method as defined in claim 1, wherein an object is updated during synchronization with the device, further comprising acts of:
   determining if the sync client is performing the update to an object;
   if the sync client is performing the update to the object and if the current write GID of the sync client is greater than a public write GID, assigning the current write GID to the generation property of the object; and
   if the sync client is performing the update to the object and if the current write GID is less than the public write GID:
      transferring the current write GID to the write generation list;
      incrementing the global GID to a reserved value; and
      assigning the reserved value to the current write GID and to the generation property of the object such that only objects updated by the sync client receive the reserved value in their generation property.

5. A method as defined in claim 4, further comprising an act of persisting the updated sync state object if the synchronization sync state object was updated during the synchronization.

6. A method as defined in claim 1, wherein the act of performing a synchronization checkpoint further comprises an act of passing in the state sync object to the sync client.

7. A method as defined in claim 1, wherein a second sync client performs an update, further comprising an act of allocating a unique current write GID for the second sync client.

8. A method as defined in claim 7, wherein the act of allocating a unique current write GID for the second sync client further comprises an act of incrementing the GID to a next value, wherein the public write GID is not changed.

9. A method as defined in claim 1, wherein the act of incrementing a global GID to a new value from a present value further comprises an act of assigning the new value to a public write GID.

10. A computer program product comprising one or more computer-readable media having computer-executable instructions for implementing a method in a system including a device that synchronizes with a synchronization partner, wherein objects or changes to objects are written to the device during synchronization, wherein the method is a method for synchronizing the device and the synchronization partner such that the objects or changes to objects written to the device during synchronization are not synced back to the synchronization partner in future synchronizations, the method comprising:
   performing a synchronization checkpoint by a sync client of the device to initiate a synchronization between the synchronization partner and the device;
   updating a synchronization state in a sync state object using the value of the global GID, wherein the synchronization state includes a Sync To GID, a Sync From GID, and write generations, wherein the write generations include a current write GID and a write generation list;
   incrementing a global GID to a new value from the present value;
   detecting changed objects based on the synchronization state; and
   synchronizing the changed objects, wherein the write generations prevent objects or changes to objects written by the sync client from being synchronized unnecessarily.

11. A computer program product comprising one or more computer-readable media having computer-executable instructions for implementing a method in a system including a device that synchronizes with a synchronization partner through a sync client, wherein the method is a method for reserving generation identifiers (GIDs) for updates performed by the sync client such that objects updated to the device during synchronization are not synchronized back to the synchronization partner, the method comprising:
   receiving a sync state object by a sync client when a synchronization checkpoint is initiated, wherein the sync state object includes a Sync From GID, a Sync To GID, a current write GID and a write generation list, wherein the write generation list stores reserved GIDs
   updating the sync state object such that the Sync To GID is transferred to the Sync From GID, a current value of a global GID is assigned to the Sync To GID, and reserved GIDs in the write generation list that are less than the Sync From GID are purged from the write generation list;

incrementing the global GID, wherein the global GID is assigned to a public write GID; and when a write is performed by the sync client and the current write GID is less than the public write GID:
transferring the current write GID to the write generation list;
incrementing the global GID to a reserved value; and
assigning the reserved value to both the current write GID and to the generation property of the object.

12. A computer program product comprising one or more computer-readable media having computer-executable instructions for implementing a method in a system including a device that synchronizes with one or more synchronization partners and wherein objects stored on the device can be updated during synchronization with the one or more synchronization partners, wherein the origin of updated objects is unknown and are therefore synced back to the one or more synchronization partners unnecessarily, wherein the method is a method for providing reserved generation identifiers (GIDs) such that the updated objects are not synced back to the one or more synchronization partners unnecessarily, the method comprising:

assigning a global GID to a store of the device, wherein a value of the global GID is assigned to a generation property of each object in the store whenever each object is updated, wherein the value of the GID assigned to the generation property is either a public write GID or a current write GID;

incrementing the global GID each time the store of the device is synchronized; wherein the synchronization is defined by a Sync To GID and a Sync From GID included in a sync state object associated with the synchronization;

assigning a reserved GID to the generation property of an object in the store of the device when the object is updated by a sync client during synchronization, wherein the reserved GID is derived from the global GID and wherein the reserved GID is only used by the sync client and is stored in the current write GID of the sync state object of the sync client; and during a next synchronization; ensuring that an object is not synchronized if the generation property of the object matches the reserved GID stored in the sync state object.

13. A computer program product comprising one or more computer-readable media having computer-executable instructions for implementing a method in a system including a device that synchronizes with a synchronization partner, wherein objects or changes to objects are written to the device during synchronization, wherein the method is a method for synchronization the device and the synchronization partner such that the objects of changes to objects written to the device during synchronization are not synced back to the synchronization partner in future synchronizations, the method comprising:

initiating a sync checkpoint by a sync client;

updating a sync state object of the sync client, wherein the sync state object is persisted after it is updated;

creating a change manifest for use in the synchronization, wherein the change manifest represents objects to be synchronized;

receiving a partner manifest from the synchronization partner; and updating objects in a store of the device according to the change manifest and the partner manifest, the act of updating objects comprising:
if the sync client has a valid current write GID, assigning the current write GID of the sync client to the GID property of the objects written by the sync client during the synchronization, wherein the current write GID is unique to the sync client;
if the sync client does not have a valid current write GID, allocating a new current write GID for the sync client and assigning the new current write GID to the GID property of the objects written by the sync client during the synchronization; and persisting the sync state object.

* * * * *

UNITED STATES PATENT AND TRADEMARK OFFICE
CERTIFICATE OF CORRECTION

PATENT NO. : 6,970,889 B2  Page 1 of 1
APPLICATION NO. : 10/864029
DATED : November 29, 2005
INVENTOR(S) : Stephen D. Flanagin et al.

It is certified that error appears in the above-identified patent and that said Letters Patent is hereby corrected as shown below:

In column 1, line 9, after "2001" insert -- , --.

In column 7, line 2, after "object" insert -- 220 --.

In column 13, line 18, in Claim 1, delete "identifier," and insert -- identifier (GID), --, therefor.

In column 13, line 20, in Claim 1, after "identifier" insert -- (GID) --.

Signed and Sealed this

Eighteenth Day of August, 2009

David J. Kappos
*Director of the United States Patent and Trademark Office*